United States Patent [19]
Kelly et al.

[11] Patent Number: 5,319,744
[45] Date of Patent: Jun. 7, 1994

[54] POLYGON FRAGMENTATION METHOD OF DISTORTION CORRECTION IN COMPUTER IMAGE GENERATING SYSTEMS

[75] Inventors: William A. Kelly, Port Orange; Lee T. Quick; Edward M. Sims, both of Ormond Beach; Michael W. Tackaberry, Daytona Beach, all of Fla.

[73] Assignee: General Electric Company, Philadelphia, Pa.

[21] Appl. No.: 679,807

[22] Filed: Apr. 3, 1991

[51] Int. Cl.$^5$ ............................................. G06F 15/62
[52] U.S. Cl. ..................................... 395/136; 395/125; 395/127; 395/133
[58] Field of Search ................ 395/119, 120, 125–130, 395/133, 136–139, 155, 161

[56] References Cited

U.S. PATENT DOCUMENTS

| | | | |
|---|---|---|---|
| 4,763,280 | 8/1988 | Robinson et al. | 395/127 X |
| 4,862,388 | 8/1989 | Bunker | 395/127 |

OTHER PUBLICATIONS

Patent Abstracts of Japan vol. 16, No. 418, Sep. 2, 1992.
Australian Computer Journal, vol. 19, No. 3, Aug. 1987, pp. 148–153.

*Primary Examiner*—Gary V. Harkcom
*Assistant Examiner*—Almis Jankus
*Attorney, Agent, or Firm*—Geoffrey H. Krauss

[57] ABSTRACT

A method for distortion correction of computer-generated textured images maps vertices and texture coefficients from viewer space to projector space, so that environmental objects are pre-distorted upon the projection raster in order to appear in their proper form and perspective when the raster is projected onto a curved surface in viewer space, and viewed therefrom. Distortion correction is carried out by utilizing a piecewise-linear approximation for smoothly, continuously and closely approximating the required pre-curvature. The viewing space raster is subdivided into a number of triangles, within each of which a linear approximation is applied to the image mapping: the raster faces are first subdivided along the lines of a rectangular grid and the face fragments falling within each rectangle are then subdivided along the grid diagonal. This produces face fragments which are small enough so that a linear approximation provides an accurate transformation of each fragment. Distortion maps, typically computed off-line and stored in a database memory, are utilized to project the edges and texture modulation gradients from view space back into projector space, so that the edges and texture patterns can now be matched at intersections of adjacent triangles, in a manner to be substantially devoid of any abrupt changes, and thus be properly pre-distorted.

11 Claims, 6 Drawing Sheets

POLYGON FRAGMENTATION METHOD OF DISTORTION CORRECTION IN COMPUTER IMAGE GENERATING SYSTEMS

FIELD OF THE INVENTION

The present invention relates to computer-image-generation (CIG) systems and, more particularly, to a novel method utilizing polygon fragmentation to generate a distortion-corrected raster for projection of a viewable undistorted raster image in such a system.

BACKGROUND OF THE INVENTION

It is well known, in the computer-image-generation arts, that if an uncorrected scene is projected through a wide-angle lens and/or onto a curved screen and viewed from off-axis, the combination of optical and geometric distortions which would occur is typically greater than can be tolerated in demanding simulation applications, such as aircraft flight training and the like. It is well known to correct for distortion by producing a correctly pre-distorted scene on a projection raster, such that when the projection raster is thrown up upon a curved surface, the resulting projected scene appears valid and undistorted to an observer. However, the prior-art distortion correction methods almost always require special purpose hardware which is designed specifically for distortion correction in the display processor portion of the CIG system, immediately prior to the display. It is highly desirable to provide a method for distortion correction in which additional, special-purpose correction hardware is not utilized and, further, in which the distortion-correction method may be implemented in a geometry processor portion of the CIG system, prior to the display processing system portion.

BRIEF SUMMARY OF THE INVENTION

In accordance with the invention, a method for distortion correction of computer-generated textured images maps vertices and texture coefficients from viewer space to projector space, so that environmental objects are pre-distorted upon the projection raster in order to appear in their proper form and perspective when the raster is projected onto a curved surface in viewer space, and viewed therefrom. Distortion correction is carried out by utilizing a piecewise-linear approximation for smoothly, continuously and closely approximating the required pre-curvature. The viewing space raster is subdivided into a number of triangles, within each of which a linear approximation is applied to the image mapping: the raster faces are first subdivided along the lines of a rectangular grid and the face fragments falling within each rectangle are then subdivided along the grid diagonal. This produces face fragments which are small enough so that a linear approximation provides an accurate transformation of each fragment. Distortion maps, typically computed off-line and stored in a database memory, are utilized to project the edges and texture modulation gradients from view space back into projector space, so that the edges and texture patterns can now be matched at intersections of adjacent triangles, in a manner to be substantially devoid of any abrupt changes, and thus be properly pre-distorted.

In a presently preferred embodiment, the foregoing method is carried out by creating a table of grid points, mapped from viewer space to projector space, once given parameters of the curved surface, the viewpoint and projector positions and attitudes, raster parameters and lens parameters. Matrix terms for adjustment of texture coefficients, at each grid point, are also computed. The rectangular grid is of a size chosen such that each triangular element thereof is sufficiently small so that a pre-selected worst case angular error is achieved. The geometry processor clips all faces to the triangular grids within the rectangles of the grid imposed upon the viewer space raster. Thus, each projectable object face is fragmented along a line of a rectangular, preferably square, grid with faces of each resulting square then being subdivided along a diagonal of that square; a diagonal having a positive slope is chosen to slightly reduce computational requirements. Edges of each face fragment within one of the triangles are then projected using pre-computed linear transformations. Modulation gradients, for texture, fading, shading and the like, are then transformed into projection space.

Accordingly, it is an object of the present invention to provide a novel method for polygon fragmentation distortion correction of scenes in a computer-image-generation system.

This and other objects of the present invention will become apparent to those skilled in the art upon reading the following detailed description of a presently preferred embodiment, when considered in conjunction with the associated drawings.

BRIEF DESCRIPTION OF THE DRAWINGS

FIG. 1' is a schematic block diagram of a typical CIG system in which the invention is used;

DETAILED DESCRIPTION OF A PRESENTLY PREFERRED EMBODIMENT

Figure 1:
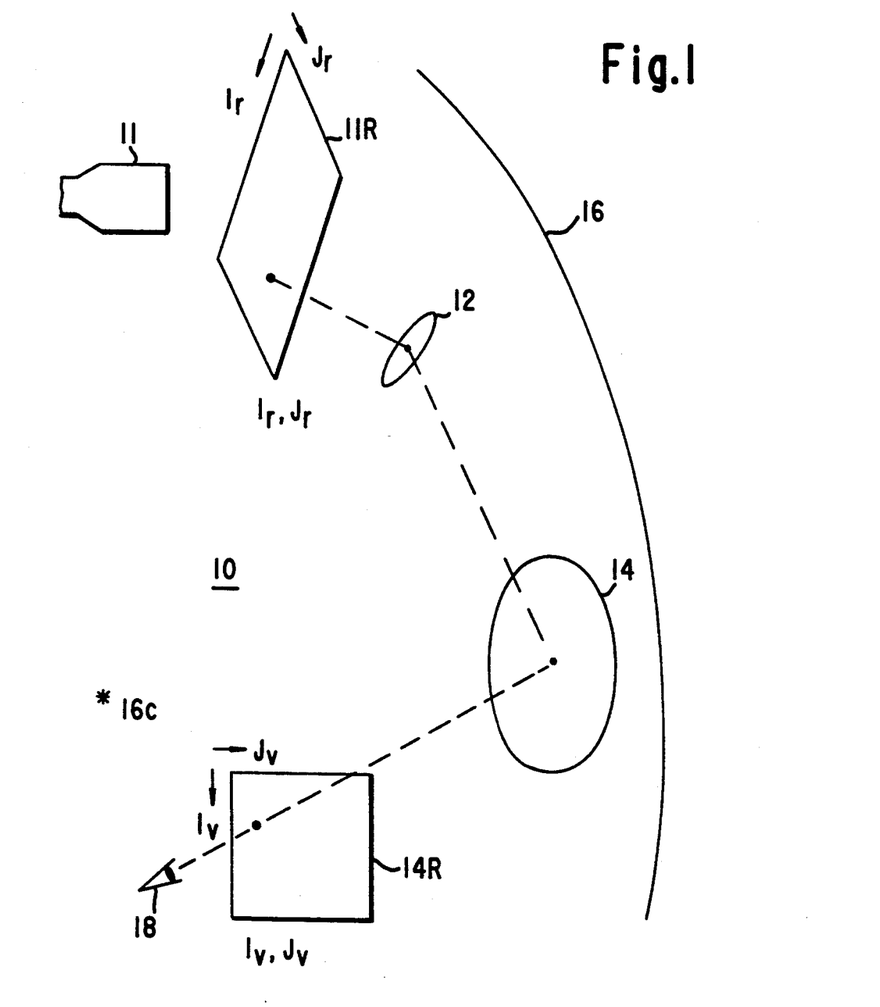
FIG. 1 is a schematic view of a CIG projection system, illustrative of the problem to be solved.

Referring initially to FIG. 1, a display means 10 of a computer-image-generation (CIG) system utilizes a projection device 11, such as a CRT and the like, for forming a projection raster 11R, in projection space (PS). The projection raster is transmitted through a projection lens 12, to cast a projected scene 14 upon a projection surface 16, such as a dome or other curved surface. The projected scene 14 is seen by a viewer 18 as a viewable raster 14R in viewing space (VS); the viewable raster 14R is a rectilinear two-dimensional coordinate system grid in which a viewer sees the environment in proper perspective. The projection raster 11R is also a rectilinear coordinate system grid, but is indexed to the raster display format; because both the projection device 11 and viewer 18 are typically located other than at the projection surface center 16c, certain geometric distortions occur when the projection raster 11R is transferred to viewer raster 14R, just as certain optical distortions may occur due to less than perfect qualities of the projection lens 12 and the like. Thus, a perfectly circular scene in the projection raster 11R will be viewed as an irregular closed curve 14 seen in the viewable raster 14R, as the projection of points $(I_r, J_r)$ on the projection raster are mapped, with distortion, to other points $(I_v, J_v)$ in the viewable raster 14R. It is highly desirable to pre-distort projection raster 11R, knowing the position of the projection device 11 and viewer 18 with respect to the geometry of surface 16, so that a pre-distorted raster is projected to appear as an undistorted projected scene 14 to the observer 18. Comprehensive distortion correction methods for such a CIG system are disclosed and claimed in, for example, U.S. Pat. Nos. 4,714,428 (issued Dec. 22, 1987) and 4,862,388 (issued Aug. 29, 1989), both assigned to the assignee of the present invention and both incorporated herein in their entireties by reference.

Referring now to FIG. 1', a functional block diagram is shown for a typical CIG system, such as an aircraft cockpit simulation system, in which the distortion problem occurs. This system includes the display means 10 which displays information to a pilot-trainee viewer 18, to simulate movement of an aircraft over a scene. The trainee viewer 18 is linked through an input control interface means 20 so that the pilot's maneuvering action in the cockpit is fed to the interface means 20, which converts the appropriate flight data, such as aircraft position, roll, pitch and yaw attitudes from the pilot viewer 18 to a controller means 22. Controller means 22 utilizes the pilot's input to calculate a new position and orientation of the aircraft and, from this data, to calculate a mathematical rotation matrix which is used to rotate objects from a reference coordinate system to a display coordinate system, in manner which is well known to the art. Other information dealing with the scene, position of targets, or other aircraft, is all calculated in controller means 22, which may be a general purpose computer and the like. Controller means 22 is periodically updated by the most recent aircraft orientation, to provide updated scenic information within a frame or field time, to a geometry processor 24.

The geometry processor 24 reads information from a scene database memory 26, which includes descriptions of objects (such as towers, roads, rivers, hangers and like) that are potentially viewable in the stored three-dimensional digital representation of the earth. The objects read from the scene database 26 are translated and rotated into display coordinates using the rotation matrix calculated in controller means 22. Geometry processor 24 clips all edges which extend beyond the view window boundaries and then mathematically projects the three-dimensional object data onto a two-dimensional display window. Object faces which extend beyond display window boundaries are then clipped in two-dimensional image space. The two-dimensional objects consist of points, lines, closed convex polygons, or combination thereof. Each closed convex polygon is known as a face, so that each processed object is made up of individual faces, where each face is bounded by straight edges. Once the faces are computed in geometry processor 24, from the three-dimensional objects, the computed data is passed to a display processor 28. Additionally, geometry processor 24 calculates which faces are in front of, or behind, other faces and stores this depth information in a priority list. A priority list contains the order of all faces in a scene, where the first face on the list is the highest priority face and the last-listed face has the lowest priority. Whenever two faces overlap on a display, the high priority face will be visible and the overlapped portion of the low priority face will be occluded or obscured. After calculating the priority list, geometry processor 24 calculates data to display end points and slopes of the line segments that bound the two-dimensional faces and calculates the coefficients of the line equations that describe the bounding edges. This data is also passed to display processor means 28.

The display processor 28 is used to drive the video display 10. Display processor 28 includes the majority of processing and hardware in a real-time computer image generation system and, for this reason, most of the previous effort in this art has been to reduce the size of the hardware and processing time of display processor means 28. In fact, the two Bunker patents referred to hereinabove are concerned with methods and extensive apparatus for providing comprehensive distortion correction by use in display processor means 28. It is well known that display processor 28 has, for each pixel in the video display raster 11R, to resolve what the color of that pixel should be, given the many faces which can be present in a single pixel and given that portions of a face may be covered by portions of other faces. After resolving the priority conflicts within a pixel, the area of each physical face within the pixel must be multiplied by the color of the face, and the sum of all these weighted colors must be output as the color of that one single pixel. Since there may be more than one million pixels in a display raster, and since the data for all of these pixels needs to be calculated within 1/60th of a second (the time for a single interlaced frame), the processing load in the display processor is very high. It is highly desirable to have the display processor means 28 receive from the geometry processor means 24 two-dimensional face descriptions (along with face color, face priorities and the like) which are already pre-distorted to apply comprehensive distortion correction without any additional display processor means 28 hardware being dedicated to the distortion correction task. Thus, geometry processor means 24 must map polygon attributes/vertices, edges, and areal textures (modulation coefficients and the like) from viewing space VS into projection space PS on a real-time basis. The geometry processor has, in storage, tables of the distortion correction values to be applied, based upon projection angles, distances and the like coordinates, obtained and entered into the memory, when the image generator was set up with projection device 11 and viewer location information relative to the projection surface 16.

Figure 1A:
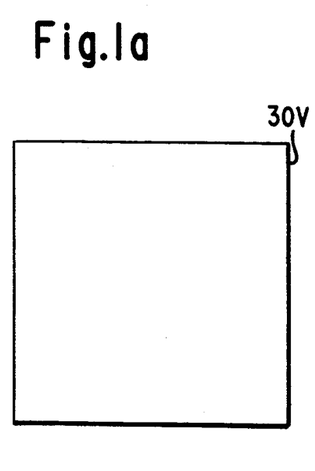
FIGS. 1a–1d are plan views of a view space in various stages of segmentation, and of details of one resulting grid cell therein.
Figure 1B:
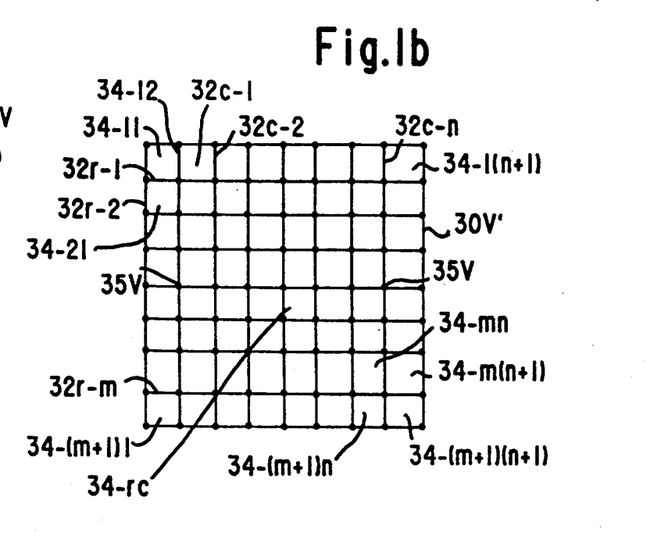
Figure 2A:
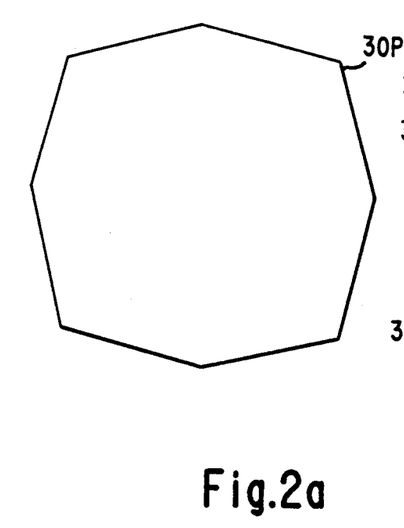
FIGS. 2a–2d are plan views of a projection space raster in various stages of segmentation, and of details of one resulting grid cell therein.
Figure 2B:
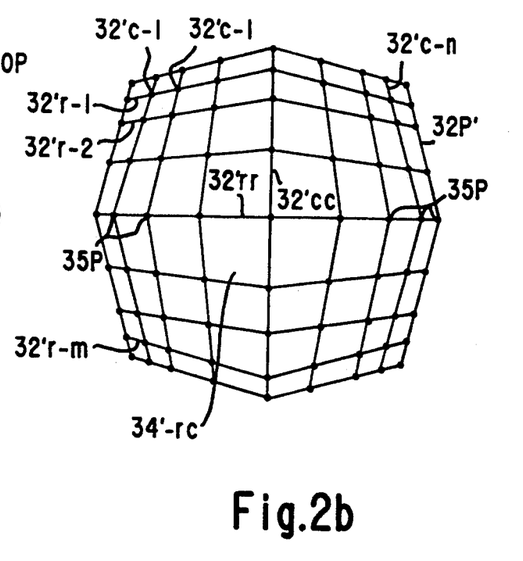

Referring now to FIGS. 1a and 2a, a substantially rectangular (preferably square) viewing space VS raster 30V is the viewable result of projecting onto curved surface 16 a non-rectangular, distorted projection space PS raster 30P. Raster 30V is analogous to raster 14R of FIG. 1, and raster 30P is analogous to raster 11R of FIG. 1. Typically, each raster 30 has a multiplicity of horizontal rows (e.g. 1000+) of picture elements (pixels) and another multiplicity of vertical columns (e.g. 1000+) of the pixels in the rows, so that a raster can leave over one million arrayed pixels. To understand our invention, consider (as shown in FIGS. 1b and 2b) the result of dividing the VS raster 30V by a regular array of horizontally-disposed row-defining boundary lines 32r (i.e. a first plurality M of horizontal boundary lines 32r-1 through 32r-m), and a second plurality of vertically-disposed column-forming boundary lines 32c (i.e. a second plurality N of vertical boundary lines 32c-1 through 32c-n). The VS raster 30V' (FIG. 1b) is thus divided into an array of a multiplicity of rectangular, preferably square, cells 34-rc, where r is the row number, from 1 through (m+1), and c is the column number, from 1 through (n+1). The PS raster 30P' (FIG. 2b) also has the cell-defining row lines 32'r and column lines 32'c which are generally not straight (except for special cases, of which one is shown, with a center vertical column line 32'cc, about which the other, non-straight, column lines are symmetrically disposed, and a straight horizontal center row line 32'rr, about which non-straight row lines are symmetrically disposed) so that each of the cells 34'-rc has a quadrilateral, rather than rectangular, two-dimensional shape. It should be understood that the number of grid lines and the spacing therebetween is selected to provide small enough cells so that any long edges are broken into pieces sufficiently small as to allow the proper curvature to appear to occur, due to piece wise-linear representation. While, in the general situation, the projection raster 30P' has a completely unsymmetrical shape, the number of cells 34 and 34' remain fixed, as does the number of pixels in each cell (which, because it covers a preselected fixed number of pixels, is sometimes referred to as a span). Thus, if each square span 34'-rc of the VS viewable raster 30V has a square array of 8×8 pixels, each non-square span 34'-rc of the PS projection raster 30P' has a non-square array of 8×8 pixels, too. One way to obtain the PS raster 30P' is to feedback the ordered grid of VS raster 30V', to find and record the coordinates of each grid crossover point 35V/35P in each space and thus form a look-up table thereof; the table is of multiple grid sets, with one set for each different pair of angles $\Theta$ and $\phi$ in the spherical coordinates from projector 11 to the location of viewer 18, reflected through the center location of scene 14.

Figure 1C:
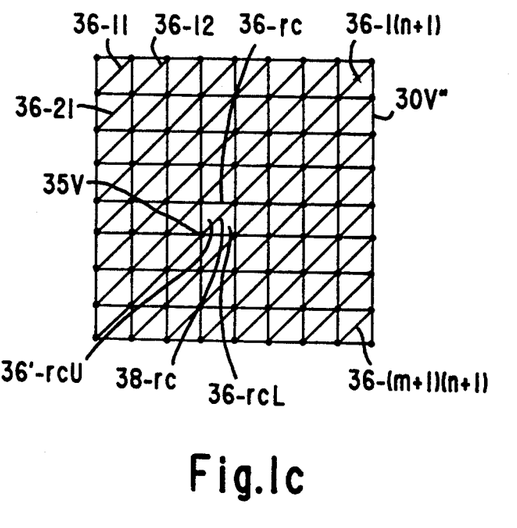
Figure 2C:
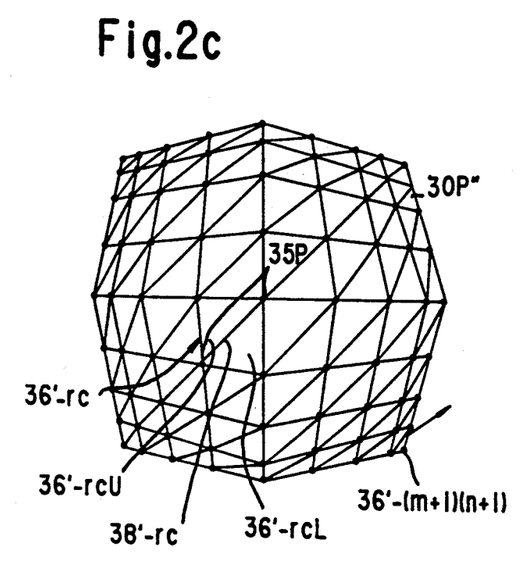

Referring now to FIGS. 1c and 2c, in accordance with one aspect of the present invention, each of the rectangular cells 34 of the VS raster 30V and the cells 34' of the PS raster 30P are cut into upper and lower triangular portions 36-rcU/36-rcL or 36'-rcU/36'-rcL by a diagonal boundary line 38/38', respectively. The projection space triangles 36' are distorted with respect to edge length and vertex angles, relative to the edge length and vertex angles of the triangular cells 36 in viewing space (wherein each triangular cell 36 may be established to have a right angle therein). The face edges and textures are so established within each of the triangular cells 36' of the projection raster 30P, to cause the transformed edges and textures within the viewing space raster 30V to form continuous edges with texture modulation coefficients which agree at the boundaries; that is, edges and textures show continuity at the boundaries. There are no abrupt edge effects, unless already present in the desired viewing scene information.

Figure 1D:
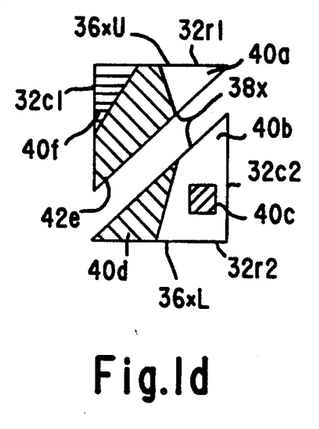
Figure 2D:
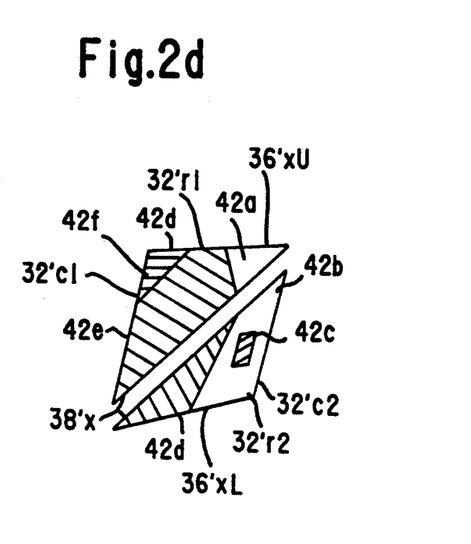

The boundary continuity must remain present even as the PS fragments are pre-distorted, as is illustrated by reference to FIGS. 1d and 2d. The upper portion 36xU of the cell is seen to be bounded by a horizontal row line 32r1, a vertical column line 32c1 and the diagonal line 38x, while the lower cell portion 36xL is seen to be bounded by a horizontal row line 32r2, a vertical column line 32c2 and the diagonal line 38x; in projection space, the generally-scalene triangular upper portion 36'xU is bounded by sides 32'r1, 32'c1 and 38'x, while the lower generally-scalene triangular portion 36'xL is bounded by diagonal 38'x and sides 32'c2 and 32'r2. Consider first the un-textured areas, such as un-textured areas 40a and 40b, which convert to similarly-untextured areas 42a and 42b in the PS fragmented cells. Other VS cell areas (e.g. area 40c, having a texture schematically shown by rising-right-diagonal shading) are contained solely within a span and may need only geometrical distortion to appear as a similarly-textured area 42c in the PS cell fragment. Still other portions of the cell are bounded, textured and extend right to the triangular fragment edges; these portions must therefore be checked for continuation into other fragments. Thus, a textured area 40d in the lower triangular fragment 36xL will be, upon checking, seen to extend as a similar-textured area 40e in the upper fragment 36xU, and therefore cause the pre-distorted fragment 36'xL to have a portion 42d which must have not only the same texture as fragment 40d, but must also match the boundary along diagonal 38'x of upper distorted fragment area 42e, with which it must share a common texture. It will be seen that the texture of area 40f, having edges along cell boundary lines 32c1 and 32r1, must be checked for commonality with adjacent cells, just as the distorted area 42f must have its texture checked for continuity with continuous areas along edges 32'c1 and 32'r1.

Our novel method thus begins with face fragmentation, in which polygon faces are fragmented by having the computer-based geometry processor separate the total VS raster (FIG. 1a) and its associated PS raster (FIG. 2a) along lines of a regular grid grid area are then divided along an areal diagonal (FIGS. 1c/2c). The resulting rectangular grid vertices 35V are then projected from view space into projector space (as vertices 35P), with the intersection of each projected edge and each grid boundary or diagonal line being projected to cross the same boundary grid/diagonal line in projector space (FIGS. 1d/2d). The vertices and line crossings being given data, line equations (e.g. of the form $L_o = -L_iI + L_jJ$) can be computed for the projected edges. Texture, fading and shading modulation values, represented by a numerator N and a denominator D term must, in accordance with the invention, be the same in projection space (i.e. at each projected vertex) as in viewing space (i.e. at the same grid vertex in viewing space), whether or not a grid point lies within a face. Therefore, the modulation numerator and denominator terms must be calculated at all grid points and vertices. We presently prefer to utilize Kramer's Rule to compute the modulation term value at each vertex. Once PS shading, fading and texture modulation values are matched to their VS counterparts along all edges, the faces are clipped to the PS linear boundaries and the PS raster is ready for synthesis and projection.

Figure 3:
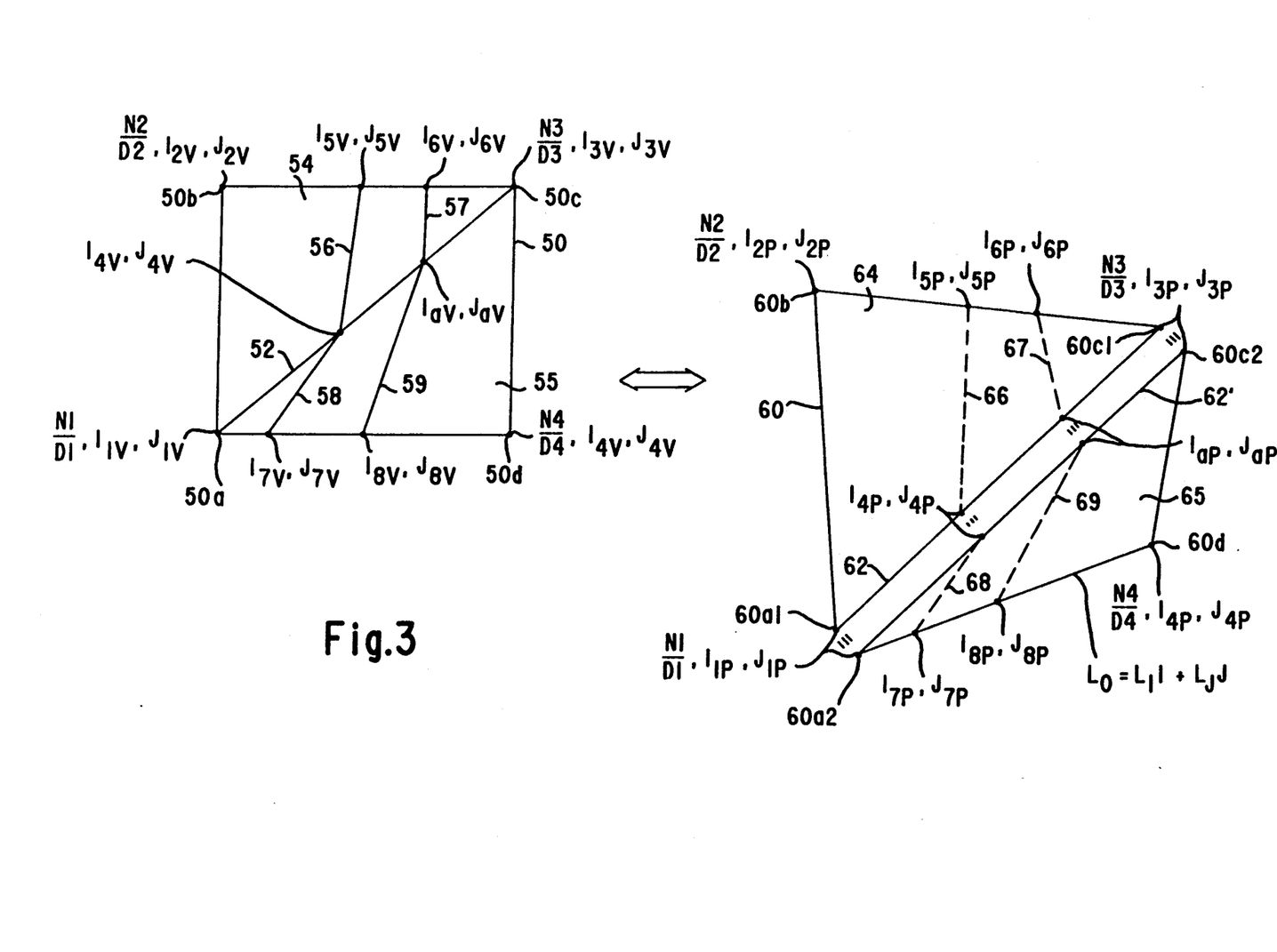
FIG. 3 is a schematic diagram illustrating the transformation between a rectangular viewing space raster cell and a quadrilateral (distorted) projection space raster cell.

The foregoing will be better understood by reference to FIG. 3, wherein one VS polygon 50 is processed in viewing space and then the final grid and diagonal points therefrom are transferred to projection space for pre-distortion. Thus, when the CIG system is started, database 26 is accessed and the VS-PS grid matrix is moved into the geometry processor 24. The grid matrix provides the four corner points 50a through 50d, respectively having vertical/horizontal raster coordinates $I_{1\nu}, J_{1\nu}$ through $I_{4\nu}, J_{4\nu}$. Polygon 50 is going to be transformed into PS distorted polygon 60, with the VS polygon vertices 50a–50d being transformed into distorted PS polygon vertices 60a-60d. The texture/fading/shading modulation values, represented by numerator and denominator terms Ni and Di, where i is the number of the associated vertex ($1 \leq i \leq 4$), are caused to be the same at the projected vertices 60a-60d as at the view space vertices 50a-50d, to assure continuity of bounding conditions and prevent sudden discontinuities. The polygons 50/60 are each divided by a diagonal 52 or 62, respectively. The PS distorted polygon 60 can now be separated into an upper triangle 64, bounded, at least in part, by diagonal 62, and a lower triangle 65, itself bounded, at least in part, by the identical diagonal line 62'. Now, each of the lines 56-59 resulting at the boundaries between different VS textured areas will determine points upon the VS grid edges and diagonal edges, which are translated to other points, in projection space, at which the analogous textured-area boundary lines 66-69 extend between transformed edge and diagonal line points. Thus, a first VS point with coordinates $I_{5v}, J_{5v}$, at the upper end of boundary line 56, is transformed to a PS point with coordinates $I_{5p}, J_{5p}$, at the upper end of PS boundary line 66, and so on.

Referring now to FIGS. 4a-4e, one specific implementation of our novel method for distortion-correction-by-cell-fragmentation will be presented in some detail. The method is general and works with any scene having a picture formed in viewer space VS by a set of convex polygons, such as polygon 70 and the like, made up of a plurality N of vertices V1, V2, V3, V4, ..., which are stored in a clockwise ordered set {V1, V2, V3, V4, ... }. Reiterating our previously-established conventions, the I direction is the vertical, top-to-bottom coordinate and the J direction is the horizontal, left-to-right coordinate. A plurality of cells 71 are created by computer-controlled placement of an offline-created grid 72 upon the raster; the grid includes numerous horizontal row lines 72r and vertical column lines 72c, each of which are mapped from viewer space to projector space by a mapping defined by projection surface radius, projected position and attitude, viewer position and attitude, raster definitions and projector lens equations. In order to output at least one PS predistorted polygon which, when projected onto the curved projection surface, will form an image for the viewer that looks very much like the given polygon 70, we will use polygon edge and grid edge intersections to determine the set of grid rectangles and parts of grid rectangles that exactly make a polygon 70. The general procedure will be to divide each grid rectangle into two triangles utilizing a cell diagonal, which, for ease of calculation will be predeterminedly chosen to be that diagonal having a positive slope m (e.g. for a raster having an increasing vertical dimension in the downward I direction and an increasing horizontal dimension in the rightward J direction, will be a diagonal going from the upper left corner of each cell to the lower right corner thereof). Vertex V1 has a position (I1, J1), while vertex V2 has a position (I2, J2), and so forth; the grid has a line span spacing $\Delta I$ between row lines 72r and a spacing $\Delta J$ between column lines 72c. Each grid cell is a span and each polygon face 70 is clipped to a single cell span by first narrowing the polygon 70 to all spans in a raster row, and then breaking the row into individual span cells, each covering a single column. It will be immediately seen that (1) the opposite reduction (i.e. to a single row in a column of cells) can be as easily used, as can simultaneous narrowing in both columns and row directions, and (2) some polygons (such as the small triangular polygon 70', defined by vertices V5, V6 and V7) fit entirely within 1 span (e.g. cell 71) and should rapidly be recognized as a special case.

Figure 4A:
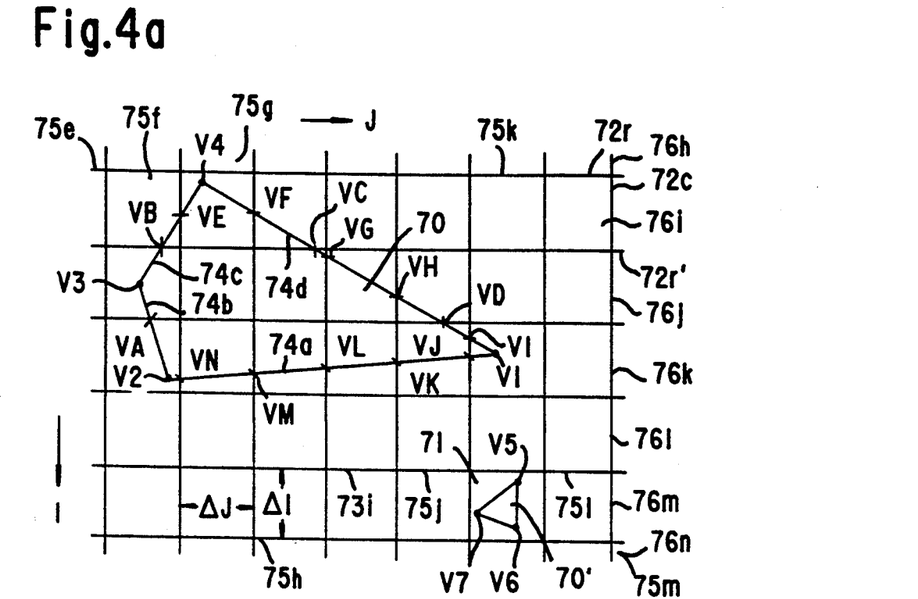
FIGS. 4a–4e are plan views of a portion of a viewing space raster, with progressively smaller area being considered to obtain the edge and texture coefficient characteristics of a single diagonally-divided grid cell, and of a distorted projection raster cell corresponding thereto.

The "windower" method algorithm first looks at all of the original VS vertices {(I1, J1), (I2, J2), ... , (Im, Jm)} and finds the maximum and minimums therein: Ivmin, Jvmin, Ivmax and Jvmax; specifically, for polygon 70, Ivmin is I4 and Ivmax is I2, while Jvmin is J3 and Jvmax is J1. The maximum and minimum I values are then divided by the grid row size $\Delta I$ to determine the respective maximum and minimum grid row numbers SImin and SImax, while the minimum and maximum J values Jvmin and Jvmax are divided by the grid column size $\Delta J$ to determine the minimum and maximums grid column numbers SJmin and SJmax, respectively. A comparison is then done between maximum and minimum grid row numbers SImin and SImax and also between the maximum and minimum grid column numbers SJmax and SJmin. If all of the polygon vertices are within one grid span (e.g. all of the vertices of polygon 70' are within the single span 71), as determined by SImin=SImax and SJmin=SJmax, then no further localization is required and a separate "output span" subprocedure (described hereinbelow) is used to complete triangular partition, if needed, before sending out data for this face at the end of the "windower" procedure. If, on the other hand, the original polygon 70 has vertices which fall in more than one span, then the various rows, each with a SI value from SImin to SImax, are individually operated upon. Each polygon may have a single row of spans or several span rows (e.g. polygon 70 has face components in the spans of rows 76i, 76j and 76k). For each polygon edge, we determine the grid rows SI1 and SI2 of the pair of vertices making up that particular edge (e.g. for edge 74b, the first grid row SI1 is row 76k, in which first vertex V2 is located, while the second grid row is row 76j, in which the vertex V3 of the opposite end is located). We first test the grid rows SI1 and SI2; if these grid rows do not differ (e.g. the edge 74a has a first vertex V1 and a second vertex V2 both lying in the same grid row 76k), then further grid row processing is not required and the procedure moves to grid column processing, as discussed herein-below. However, if the grid rows of the two vertices making up the edge do differ (e.g. the edge 74d has a first vertex V4 in a first row 76i and has a second vertex V1 in a different grid row 76k), then, for all of the horizontal row lines 72r, 72r', ... forming the edges of these grid rows 76i and 76k in which the vertices are located, and for all grid rows therebetween, we compute the intersection (Ix, Jx) between each of these horizontal lines and the polygon edge (e.g. if the first and second vertices are (I1, J1) and (I2, J2), then the slope $m=(J2-J1)/(I2-I1)$, and the row intersection Ix is the product of a grid row number R and the distance $\Delta I$ between the grid rows, while the Jx intersection value is given by $Jx=J1+m(Ix-I1)$). Each of these row intersection points is added, with clockwise order being maintained, to the original set of vertices making up the polygon. Thus, the original polygon vertices {V1, V2, V3, V4} after row processing become {V1, V2, VA, V3, VB, V4, VC, VD}.

Figure 4B:
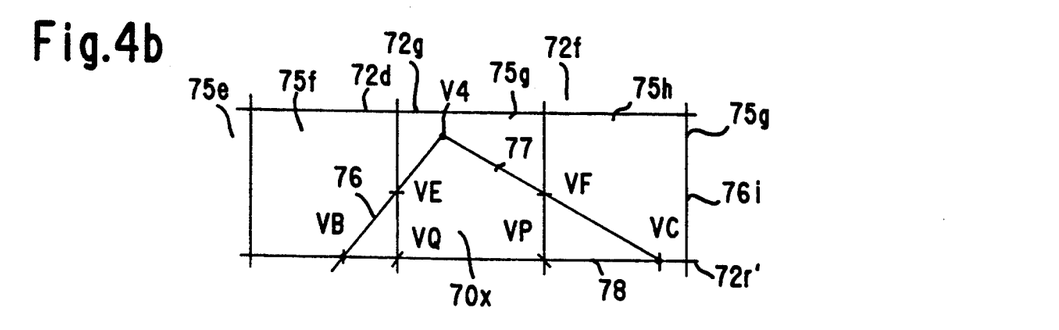
Figure 4C:
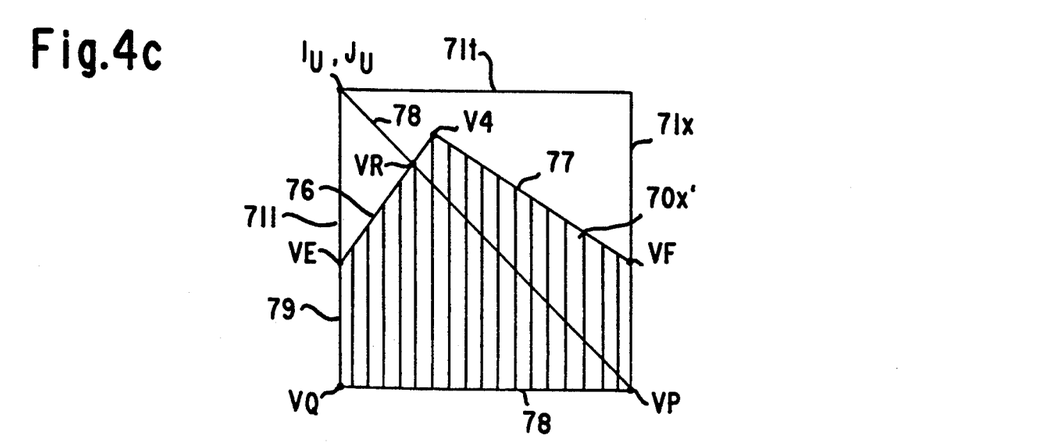
Figure 4D:
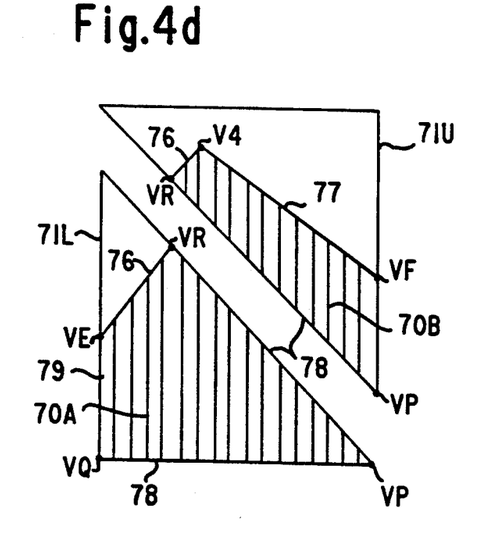

Now, for each grid row contained in polygon 70, having previously determined that there is more than one such polygon grid row, the result of testing the minimum and maximum horizontal J values SJmin and SJmax is used. If the minimum and maximum grid column numbers are equal, then only one grid rectangle is of interest in the grid row then being processed. As in the case where there is no difference in maximum and minimum grid row numbers, the "output span" subprocedure is accessed to complete triangular partitioning, if needed, for the grid span, before the data is output and utilized to construct the portion of the pre-distorted polygon which occurs in the PS span corresponding to the VS span which is processed. If, however, SJmin≠SJmax for that row, then more than one grid column is of interest and each polygon edge (in that grid row then being processed) is examined and the grid columns SJ1 and SJ2 of the two vertices making up that edge are determined. For example, in the row 76$i$ (FIG. 4$b$) we find that there is more than one column (e.g. columns 75$f$, 75$g$ and 75$h$) which are of interest, as containing a portion 70$x$ of polygon 70. If more than one grid column is present (as in the example) then for each polygon edge (e.g. edges 76, 77 and 78) the procedure is to compute the intersection (Iy, Jy) of the polygon edge and the vertical grid column lines 72$c$ making up the involved grid columns. These vertical column line intersections (e.g. intersections VE and VF) are found by setting the polygon edge vertices VB=(I1, J1) and V4=(I2, J2), then finding the slope $m'=(I2-I1)/(J2-J1)$; the vertical line intersection horizontal value of Jy is then the product of a grid column number C and the distance ΔJ between grid columns, while the vertical intersection value $Iy=I1+m'(Jy-J1)$. Each of these intersection points is added, still maintaining clockwise order, to the original set of vertices for the grid row being considered. In addition, any intersection of a row-forming line (e.g. added line 78 required to close the polygon portion 70$x$ and the row under consideration) with one of the vertical lines (e.g. intersection points VP and VQ) is added to the set of grid row vertices (e.g. the set {VB, VE, V4, VF, VC, VP, VQ}). After each column of the grid row is determined, the "output span" subprocess is called to complete triangular partitioning, if needed, for this grid rectangle. It will be seen that this completes a "double loop" processing cycle, with a minor loop being utilized to determine each of at least one column, within each of at least one row falling within the major loop of this "windower" procedure. Thus, the foregoing procedure serves to provide an ordered set of vertices for each grid span 71 of the viewer space raster.

FIG. 4$c$ shows one such grid span 71$x$; in particular, the span in column 75$g$ and row 76$i$, including the last ordered original corner vertex V4, is shown. The polygon portion 70$x'$ within this span 71$x$ is shown with vertical hatching; the span grid points are {V4, VF, VP, VQ, VE}. The "output span" sub-procedure is used upon each grid span 71. In each grid span of interest (where the grid span top edge 71$t$ is denominated Itop and the grid left edge 71$l$ is denominated Jleft) we determine, for each polygon vertex (e.g. vertices V4, VF, VP, VQ, and VE) which side of a grid diagonal 78, placed to extend from the grid upper-left corner to the grid lower-right corner, i.e. with a positive slope, each of the vertices is located on. This is accomplished by computing a quantity Side=(Iv−Itop)−mD*(Jv−Jleft), where (Iv, Jv) is the location of the polygon vertex under investigation, and mD is the slope of diagonal line 78, i.e. the distance ΔI between the grid rows divided by the distance ΔJ between the grid columns. If the vertex then being tested is virtually on the diagonal (with quantity Side equal, or substantially equal, to zero), then that particular vertex point (Iv, Jv) is "captured" into both the upper-right triangle 71U and, the lower-left polygon triangle 71L (see FIG. 4$d$). If the quantity Side is not substantially equal to zero, the location of the previous vertex point must be considered: if Side was less than zero and the previous point was not in the lower-left triangle, then the particular vertex point (Iv, Jv) will be in the upper-right triangular portion 71U of the grid rectangle, whereas, if Side is greater than zero and the previous point was not in the upper-right triangle, we must capture the vertex point (Iv, Jv) under investigation into the lower-left triangular polygon portion 71L. If Side was less than zero and the previous vertex point was in the lower-left triangle 71L, or if quantity Side was greater than zero and the previous point was in the upper-right triangle 71U, the edge is crossing diagonal 78 and a special "intersection" subroutine must be called to find the grid point (here, intersection grid point VR) where the polygon edge (here edge 76, between vertices VE and V4) intersects diagonal 78. The intersection point VR is then placed in both triangle polygon portions 71L and 71U. Finally, having come to the last vertex (e.g. grid point VQ, if the ordered set begins with vertex VE), the procedure is done for edge 79. This final edge, going from the last vertex back to the first vertex, is tested and, if the first and last vertices fall in opposite triangular portions, the "intersection" subroutine must be called to find the point of intersection between the edge made by these vertices and grid diagonal 78, before the intersection point is stored in both triangle polygon point sets. The "output span" subprocess is completed by outputting the resulting triangle polygon point sets as a distortion-critical portion of the original polygon. Thus, as shown in FIG. 4$d$, the span 71$x$ is output as a first polygon face portion 70A, formed in lower-left polygon triangle 71L, with the ordered vertex set {VE, VR, VP, VQ}; the polygon also contains a face portion 70B, in upper-right polygon triangle 71U, having the ordered vertex set {VR, V4, VF, VP}. It will be understood that there are a number of suitable subroutines for use as a "intersection"-finding subroutine hereinabove mentioned. One such subroutine might find the intersection based upon the use of three grid points, viz. an upper-left grid corner point (Iu, Ju), the start vertex (I1, J1) of the polygon edge being considered, and the polygon edge end vertex (I2, J2). A first quantity delI can be computed as (I2−I1), while a second quantity delJ is computed as (J2−J1), so that a constant K=(mD*(J1−Ju)−(I1−Iu))/(delI−mD*delJ) can be computed, and used to find the diagonal intersection point coordinates (Ir, Jr), where Ir=I1+K*delI and Jr=J1+K*delJ.

Figure 4E:
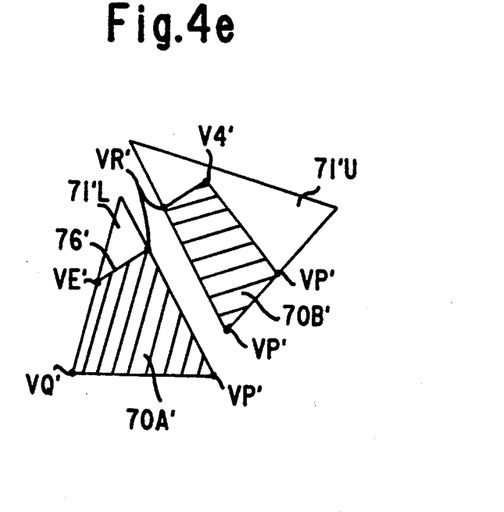

Each of the points in the resulting ordered point set is translated to a corresponding point in the PS triangles 71'U and 71'L (FIG. 4$e$), utilizing the transformation matrix obtained by knowing the projection angles involved. Thus, in triangle 71L, the set of points {VE, VR, VP, VQ} transforms to the set of points {VE', VR', VP', VQ'}, and each of these points can now be connected by an edge (e.g. edge 76' connecting points VE' and VR', just as edge 76 connected VE and VR in the original rectangular grid triangle 71L). The texture of the portion 70'A is then matched to that of polygon portion 70A, and so on.

While a presently preferred embodiment of our novel polygon fragmentation method for providing distortion correction in computer image generation systems, has been described in some detail herein, many modifications and variations will now become apparent to those skilled in the art. It is our intent, therefore, to be limited only by the scope of the appending claims and not by the specific details and instrumentalities presented by way of explanation of the preferred embodiment herein.

What we claim is:

1. A method for pre-distorting a projection space PS video raster scene, formed of polygons having edges, to project upon a projection surface in a manner to be viewed as an undistorted VS video raster scene, having edge-defined polygons, by a viewer in viewer space VS, comprising the steps of:
    (a) assigning a regular undistorted array grid with a multiplicity of row and column lines to divide the VS raster into an array of cells;
    (b) arranging a diagonal line between one pair of opposite corners of each cell in the VS raster grid array;
    (c) determining in the VS raster an ordered set of all points (VS crossing points) at which each polygon edge crosses any of the grid and diagonal lines;
    (d) projecting each VS crossing point back into PS projection space to determine an associated PS space projected crossing point to which that VS crossing point will be transformed;
    (e) creating a line connecting each pair of projected PS crossing points which correspond to a pair of VS crossing points connected by an interconnecting polygon edge in the view raster, with a plurality of PS connecting lines thus created enclosing an associated PS raster area; and
    (f) matching textural area factors in each PS raster area thus formed to similar textural area factors in the corresponding VS area.

2. The method of claim 1, wherein step (a) further includes the step of forming the VS raster grid with rectangular cells.

3. The method of claim 2, wherein each cell is square.

4. The method of claim 1, wherein step (b) further includes the step of providing all of the VS raster grid diagonal lines in the same direction.

5. The method of claim 4, wherein all of the diagonal lines have a positive slope.

6. The method of claim 1, wherein step (d) includes the steps of: storing a set of the equivalent VS and PS points for a predetermined VS-PS relationship; and retrieving the stored set whenever that VS-PS relationship is used.

7. The method of claim 6, wherein step (d) further includes the step of storing pre-computed transformation point sets for a multiplicity of VS-PS relationships.

8. The method of claim 7, wherein the pre-computed, stored sets cover expected a selected range of VS-PS projection angle relationships.

9. The method of claim 1, wherein step (f) includes the step of matching the VS areal texture to a calculated PS texture at each of the set of crossing points.

10. The method of claim 9, wherein the view space areal texture is a function having both a numerator $N_v$ and a denominator $D_v$ and the projection space areal texture is a function having both a numerator $N_p$ and a denominator $D_p$, and step (f) includes the steps of: matching the PS numerator Np to the VS numerator Nv for each textured area; and simultaneously matching the PS denominator Dp to the VS denominator Dv for that same textured area.

11. The method of claim 10, wherein the textured area matches are sufficiently close so as to prevent abrupt modulation changes at area boundaries.

* * * * *